June 11, 1957 — L. LOEB — 2,795,140
NON-FRAGILE THERMOMETERS
Filed Nov. 2, 1953
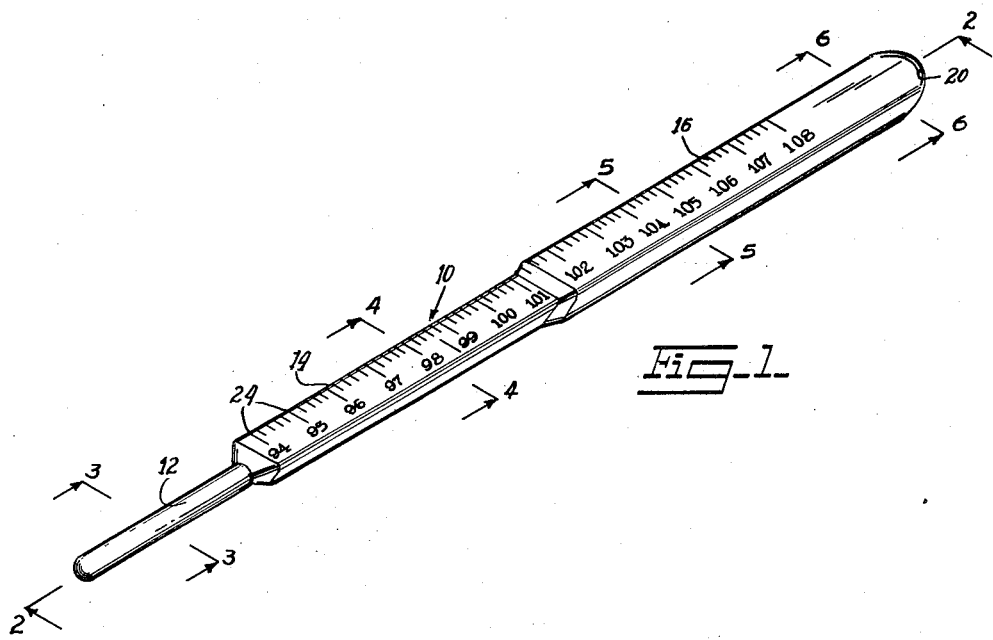
Fig-1-
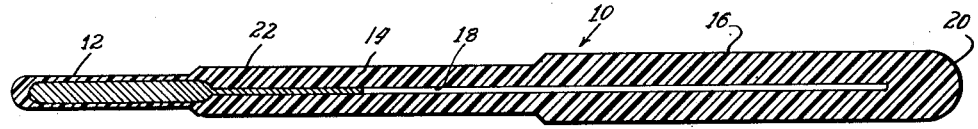
Fig-2-
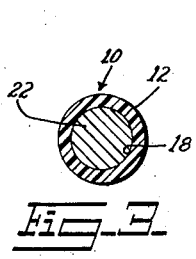
Fig-3-
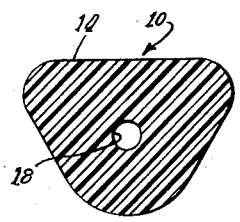
Fig-4-
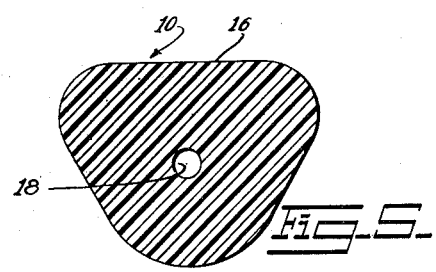
Fig-5-
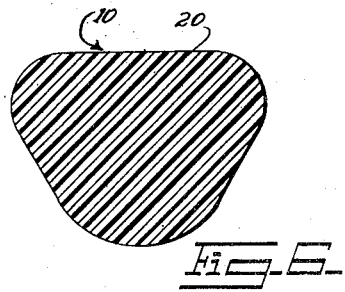
Fig-6-
INVENTOR.
LEO LOEB
BY
ATTORNEY

2,795,140
NON-FRAGILE THERMOMETERS

Leo Loeb, New York, N. Y.

Application November 2, 1953, Serial No. 389,596

1 Claim. (Cl. 73—371)

This invention relates to a clinical thermometer, of either the rectal or oral type, used for determining elevations in body temperature.

Thermometers of the type stated are generally formed of glass, and when dropped or accidentally struck, often break. It is not too uncommon, further, for a thermometer to break when being used orally, when, as sometimes happens, the patient clamps the same between the teeth.

In view of the above, it is the broad object of the present invention to provide a clinical thermometer the body of which is formed of an unbreakable material.

A further object of importance is to form a thermometer for the material stated without affecting the thermal conductivity of the body of the thermometer adversely.

Yet another object is to so form a thermometer as to provide therein a body the thickness of which varies at different locations along the length of the thermometer, thus to impart strength to the thermometer at the particular points at which breakage tends to occur, while still leaving the wall of the thermometer thin at the tip, where a high thermal conductivity characteristic is particularly desirable.

Another object is to form a thermometer in a manner wherein one end of the same will overbalance the other end to a substantial degree, thus to cause said one end to point downwardly by reason of its greater weight when the thermometer is accidentally dropped. In this way, it is proposed to cause the heavier, stronger end of the thermometer body to take the initial impact when the thermometer is dropped, with a view to absorption of the force of impact at a location remote from the bulb or tip in which the mercury is located, thus to minimize the possibility of separation of the mercury.

For further comprehension of the invention, and of the objects and advantages thereof, reference will be had to the following description and accompanying drawings, and to the appended claim in which the various novel features of the invention are more particularly set forth.

On the accompanying drawings forming a material part of this disclosure:

Fig. 1 is a perspective view of a thermometer formed in accordance with the invention.

Fig. 2 is a longitudinal sectional view on line 2—2 of Fig. 1.

Fig. 3 is an enlarged transverse sectional view on line 3—3 of Fig. 1.

Fig. 4 is an enlarged transverse sectional view on line 4—4 of Fig. 1.

Fig. 5 is an enlarged transverse sectional view on line 5—5 of Fig. 1.

Fig. 6 is an enlarged transverse sectional view on line 6—6 of Fig. 1.

The reference numeral 10 has been applied generally in the drawing to a thermometer formed in accordance with the invention. The thermometer is manufactured, basically, in a conventional manner so far as insertion of the mercury and sealing of the same is concerned. However, the thermometer differs from thermometers in general use, in that it is formed wholly of a non-fragile, transparent material. It is proposed, in this regard, that the thermometer will be formed of a transparent plastic, mica, isinglass, a transparent rubber and glass compound, or a transparent compound of rubber and silicate.

In any event, the thermometer is formed at one end with a tip or bulb 12 which, as shown in Figs. 2 and 3, is of thin-wall construction. The tip is thus possessed of a high thermal conductivity rating, and will rapidly conduct body heat when in use, whether the thermometer be of the oral type, or of the rectal type.

The tip 12 at one end merges into an inner end portion 14. Inner end portion 14 extends from the tip to the approximate midlength location of the thermometer, and is noticeably greater in thickness than is the tip. At that end thereof remote from the tip, the portion 14 merges into an outer end portion 16 the thickness of which is even greater than that of portion 14. Thus, the thermometer body is externally stepped in the direction of its length, being progressively increased in thickness from its inner or tip end to its outer end.

The portion 14 would also be inserted, when the thermometer is in use, and will assist in conducting heat to the mercury of the thermometer, since it is only slightly thicker than the tip. At the same time, however, the portion 14 is of such thickness as to impart added strength to the thermometer, over the portion of the body length through which the portion 14 extends.

As shown in Figs. 4–6, the thermometer illustrated is of approximately triangular, slightly flattened cross-section, with rounded corners, except for the tip, which is of circular cross section. However, the cross sectional shape can be varied if desired, and the illustrated shape is considered merely representative of many that might be employed.

Formed in the thermometer is an axial bore 18 extending for substantially the full length of the thermometer body, said bore being closed at both ends. At one end, the bore terminates in closely spaced relation to the free end of the tip. At its other end, however, the bore terminates a substantial distance from the free end of the end portion 16, thus to define a solid area 20 at said last named free end. Sealed within the bore is a quantity of mercury 22.

Calibrations 24 are marked on the external surface of the thermometer body, in the usual manner.

By reason of the construction illustrated and described, the thermometer will be unbreakable under ordinary circumstances. Further, it is important to note that while the thermometer is formed of breakage-resistant material, the stepped thicknesses will still permit its normal use, the thermometer body having high conductivity in the tip area, and slightly lower but nevertheless still high conductivity in the area of the inner end portion.

Still further, it is important to note that the construction illustrated will cause the thermometer to be overbalanced at one end, the outer end portion being substantially heavier than the inner end portion. This has the desirable effect of causing the outer end portion, and in particular the solid part 20, to point downwardly when the thermometer is dropped, thus to cause the main impact to be taken by the solid part. The considerable amount of material in the outer end portion and solid part tends to provide for increased absorption of the force of impact, thus causing the force to be dissipated in large measure before it reaches the mercury. As a result, separation of the mercury does not tend to occur as readily as in ordinary, glass thermometers.

It should be understood that a non-fragile thermometer has universal use in freezers, on calendars, etc. and this application reserves that right even though it uses a clinical thermometer, for graphic purposes.

It also reserves the right to use of any non-fragile transparent plastic or metal such as mica, a silicate, etc. as a base composition.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A clinical thermometer comprising an elongated transparent body of unbreakable plastic material, said body being formed at one end with an elongated tip having high thermal conductive ability and being circular in cross-section, a body section connected at one end to one end of said tip, said body section being triangular in cross-section and being of greater cross-sectional area than the tip, said connection constituting a slanting shoulder merging gracefully with the tip and body section, said tip and body section extending for one-half the length of the body, and another body section extending the remaining half of the length of the body and being connected at one end to the other end of the first-named body section, said second-named body section being triangular in cross-section and having a greater cross-sectional area than the first-named body section, said latter connection constituting a slanting shoulder merging gracefully with the ends of the body sections, each of said body sections being of uniform diameter throughout its respective length, said tip and body portions formed with a bore therein, the portion of said bore in said tip being of greater diameter than the bore in the body sections to provide greater conductivity and to lessen the weight of the body at its tip end, said bore terminating in said second body portion at a point remote from the extreme free end of the last-named body section whereby said end is solid and weighted and a thermal expansive fluid in the bore in said tip, one of the plane surfaces of said body sections having calibrations thereon.

References Cited in the file of this patent

UNITED STATES PATENTS

| 489,259 | Maxium et al. | Jan. 3, 1893 |
| 517,446 | Denton | Apr. 3, 1894 |
| 848,458 | Grafton | Mar. 26, 1907 |
| 1,005,339 | Siebert et al. | Oct. 10, 1911 |
| 1,488,403 | Macbeth | Mar. 25, 1924 |
| 2,035,334 | Monrad | Mar. 24, 1936 |
| 2,158,045 | Palmer | May 9, 1939 |

FOREIGN PATENTS

| 7,357 | Great Britain | Feb. 16, 1899 |
| 253,988 | Switzerland | July 3, 1946 |
| 948,170 | France | Jan. 24, 1949 |